US007763800B2

(12) United States Patent
Lesniak et al.

(10) Patent No.: US 7,763,800 B2
(45) Date of Patent: Jul. 27, 2010

(54) CABLE PATHWAY SYSTEM

(75) Inventors: Scott M Lesniak, Lockport, IL (US); Dennis J Waszak, Wheaton, IL (US); Robert Nicoli, Glenwood, IL (US); David R Davis, Richton Park, IL (US)

(73) Assignee: Panduit Corp., Tinley Park, IL (US)

( * ) Notice: Subject to any disclaimer, the term of this patent is extended or adjusted under 35 U.S.C. 154(b) by 13 days.

(21) Appl. No.: 11/924,897

(22) Filed: Oct. 26, 2007

(65) Prior Publication Data
US 2009/0107718 A1    Apr. 30, 2009

Related U.S. Application Data

(62) Division of application No. 11/924,800, filed on Oct. 26, 2007.

(51) Int. Cl.
*H02G 3/04* (2006.01)
*H02G 3/00* (2006.01)

(52) U.S. Cl. .................. 174/68.3; 174/480; 174/481; 174/72 A; 174/68.1; 385/135; 248/68.1

(58) Field of Classification Search ........... 174/480, 174/481, 97, 72 A, 68.1, 68.3, 100, 135; 385/134, 385/135; 211/162, 26; 248/49, 68.1, 58
See application file for complete search history.

(56) References Cited

U.S. PATENT DOCUMENTS

| | | | |
|---|---|---|---|
| 3,968,322 A * | 7/1976 | Taylor | .......... 174/72 A |
| 4,141,524 A | 2/1979 | Corvese, Jr. | |
| 4,158,754 A | 6/1979 | Yonezaki et al. | |
| 4,320,261 A | 3/1982 | Scerbo et al. | |
| 4,363,459 A | 12/1982 | Holzer | |
| 4,860,168 A | 8/1989 | Wiljanen et al. | |
| 4,907,766 A | 3/1990 | Rinderer | |
| 5,044,589 A | 9/1991 | Milne et al. | |
| 5,067,678 A | 11/1991 | Henneberger et al. | |
| 5,142,606 A | 8/1992 | Carney et al. | |
| 5,503,354 A | 4/1996 | Lohf et al. | |
| 5,580,014 A | 12/1996 | Rinderer | |
| RE35,479 E | 3/1997 | Witherbee et al. | |
| 5,923,753 A | 7/1999 | Haataja et al. | |

(Continued)

OTHER PUBLICATIONS

Mattei et al (2003/0051892), "Cable Channel Assembly". Mar. 20, 2003.*

*Primary Examiner*—Angel R Estrada
(74) *Attorney, Agent, or Firm*—Robert A. McCann; Christopher S. Clancy; James H. Williams

(57) ABSTRACT

A cable pathway system has a base with a bottom, a generally planar top surface, a first side, and a second side. The base is configured to be secured to an electronic equipment enclosure and also has an aperture formed therein and a wall positioned adjacent to the aperture. The wall has a curved surface that extends from the top surface to the bottom. A first sidewall extends from the top surface along the first side and extends generally perpendicular to the top surface and substantially along the length of the first side. A second sidewall also extends from the top surface along the second side and extends generally perpendicular to the top surface and substantially along the length of the second side.

4 Claims, 13 Drawing Sheets

U.S. PATENT DOCUMENTS

| | | | |
|---|---|---|---|
| 5,969,292 | A | 10/1999 | Snider, Jr. et al. |
| 6,002,089 | A | 12/1999 | Hemingway et al. |
| 6,129,316 | A | 10/2000 | Bauer |
| 6,263,144 | B1 | 7/2001 | Daoud |
| 6,271,476 | B1 | 8/2001 | Bobowick et al. |
| 6,310,294 | B1 | 10/2001 | DiGirolamo et al. |
| 6,365,830 | B1 | 4/2002 | Snider, Jr. et al. |
| 6,388,193 | B2 | 5/2002 | Maynard et al. |
| 6,412,733 | B1 | 7/2002 | Grzemski |
| 6,437,243 | B1 * | 8/2002 | VanderVelde et al. ...... 174/68.3 |
| 6,541,704 | B1 | 4/2003 | Levenson et al. |
| 6,541,705 | B1 | 4/2003 | McGrath |
| 6,546,179 | B2 | 4/2003 | Petri |
| 6,586,680 | B1 | 7/2003 | Nelson |
| 6,603,073 | B2 * | 8/2003 | Ferris ........................ 174/68.3 |
| 6,625,373 | B1 | 9/2003 | Wentworth et al. |
| 6,631,874 | B2 | 10/2003 | Turpin et al. |
| 6,763,169 | B2 | 7/2004 | Wentworth et al. |
| 6,803,524 | B2 | 10/2004 | Levenson et al. |
| 6,915,056 | B2 | 7/2005 | Wentworth et al. |
| 6,967,283 | B2 | 11/2005 | Rasmussen et al. |
| 6,992,247 | B2 | 1/2006 | Rasmussen et al. |
| 7,055,786 | B2 | 6/2006 | Garassino et al. |
| 7,155,104 | B2 | 12/2006 | Wentworth et al. |
| 2002/0097973 | A1 | 7/2002 | Petri |
| 2002/0179779 | A1 | 12/2002 | Turpin et al. |
| 2003/0051892 | A1 | 3/2003 | Mattei et al. |

* cited by examiner

CABLE PATHWAY SYSTEM

CROSS-REFERENCE TO RELATED APPLICATION

This application is a divisional of patent application Ser. No. 11/924,800, filed Oct. 26, 2007.

FIELD OF INVENTION

This invention relates to cable pathway systems and, more particularly, to cable pathway systems used in association with electronic equipment cabinets to form a pathway for cables which enter and exit the electronic equipment cabinets.

BACKGROUND

Currently, typical cable pathway systems employ ladder racks or wire frame baskets. These racks and baskets are suspended from the ceiling by threaded rods embedded in the ceiling and may require additional time and/or labor to install. In addition, once these racks or baskets are installed, it is difficult to change or reconfigure the cable pathway systems without substantial labor. Furthermore, as the cooling requirements of data centers increase the height of the raised floor increases, thereby decreasing the clearance available between the top of the electronic equipment enclosures and the ceiling, making installation of these pathways even more difficult.

Therefore, there is a need for a cable pathway system that can be easily and quickly installed and reconfigured and that does not take up excessive space between the electronic equipment enclosures and the ceiling.

SUMMARY OF THE INVENTION

In one example, a cable pathway system is provided that has a base with a bottom, a generally planar top surface, a first side, and a second side. The base is configured to be secured to an electronic equipment enclosure and also has an aperture formed therein and a wall positioned adjacent to the aperture. The wall has a curved surface that extends from the top surface to the bottom. A first sidewall extends from the top surface along the first side and extends generally perpendicular to the top surface and substantially along the length of the first side. A second sidewall also extends from the top surface along the second side and extends generally perpendicular to the top surface and substantially along the length of the second side.

In another example, a method for providing a cable pathway system is provided having the steps of: positioning a base on an electronic equipment enclosure such that a bottom of the base is adjacent the electronic equipment enclosure, a first sidewall extends from the base and is generally aligned with a front of the enclosure, and a second sidewall extends from the base and is generally aligned with a back of the enclosure: aligning an aperture formed in the base with an opening formed in a top cover of the enclosure; and securing the base to the enclosure.

In another example, an electronic equipment installation is provided that has first and second adjacent electronic equipment enclosures. A first cable pathway system is secured to the first electronic equipment enclosure and a second cable pathway system is secured to the second electronic equipment enclosure. The first and second cable pathway systems each have a base with a bottom, a generally planar top surface, a first side, and a second side. The base is configured to be secured to an electronic equipment enclosure and also has an aperture formed therein and a wall positioned adjacent to the aperture. The wall has a curved surface that extends from the top surface to the bottom. A first sidewall extends from the top surface along the first side and extends generally perpendicular to the top surface and substantially along the length of the first side. A second sidewall also extends from the top surface along the second side and extends generally perpendicular to the top surface and substantially along the length of the second side.

BRIEF DESCRIPTION OF THE DRAWINGS

Certain examples of the present invention are illustrated by the accompanying figures. It should be understood that the figures are not necessarily to scale and that details that are not necessary for an understanding of the invention or that render other details difficult to perceive may be omitted. It should be understood, of course, that the invention is not necessarily limited to the particular examples illustrated herein.

DETAILED DESCRIPTION

Figure 1:
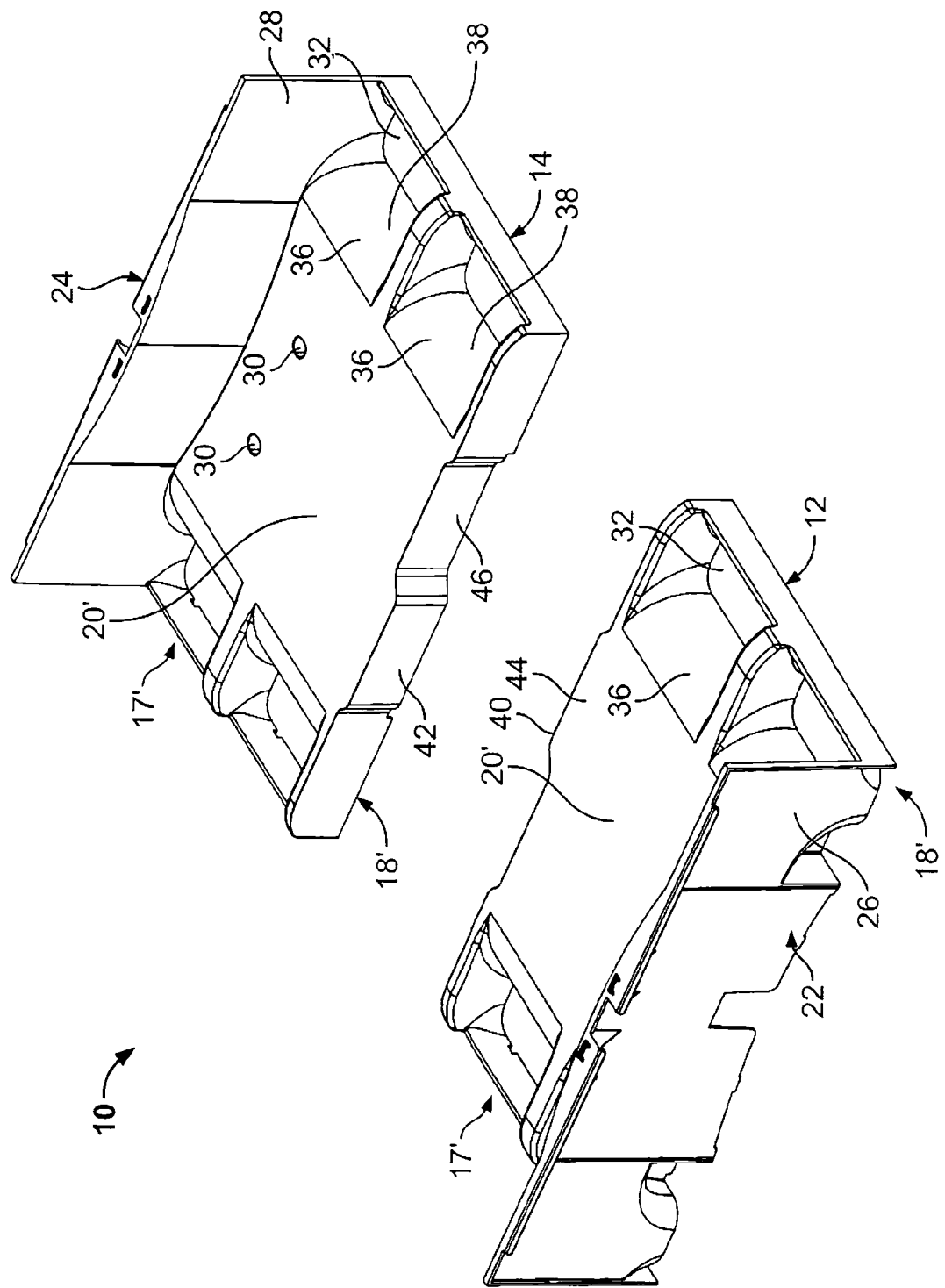
FIG. 1 is a perspective exploded view of two sections of the cable pathway member of the cable pathway system.
Figure 2:
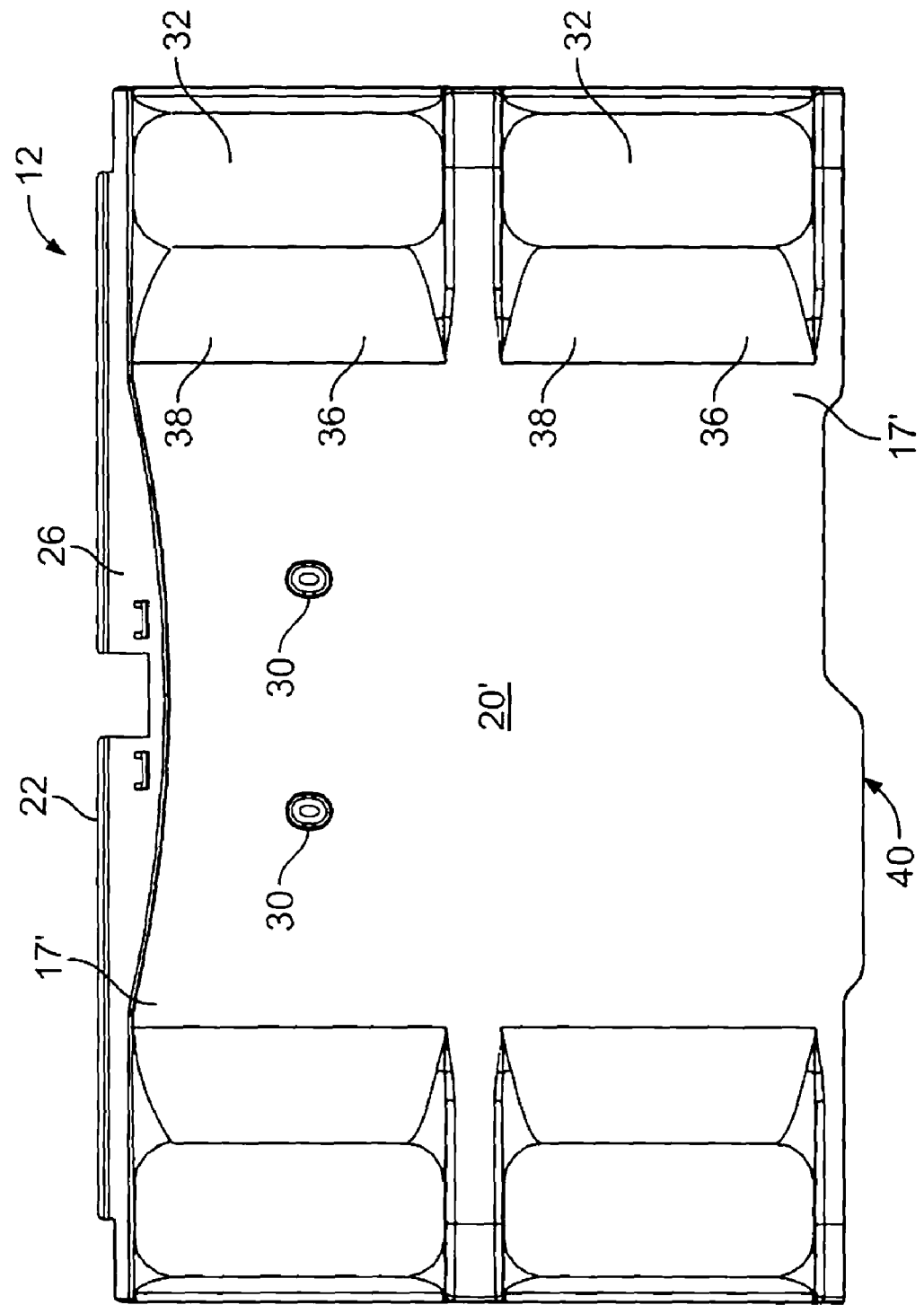
FIG. 2 is a top plan view of one section of the cable pathway member of FIG. 1.

Referring to FIG. 1, one example of the cable pathway system, utilized to carry various electronic cables for power and communication, includes a cable pathway member 10. In this example, cable pathway member 10 is shown in two sections 12 and 14, which when positioned adjacent to one another, form cable pathway member 10. Alternative examples could include pathway member 10 constructed of a single piece or even constructed of a greater number of sections than shown in FIG. 1.

Figure 3:
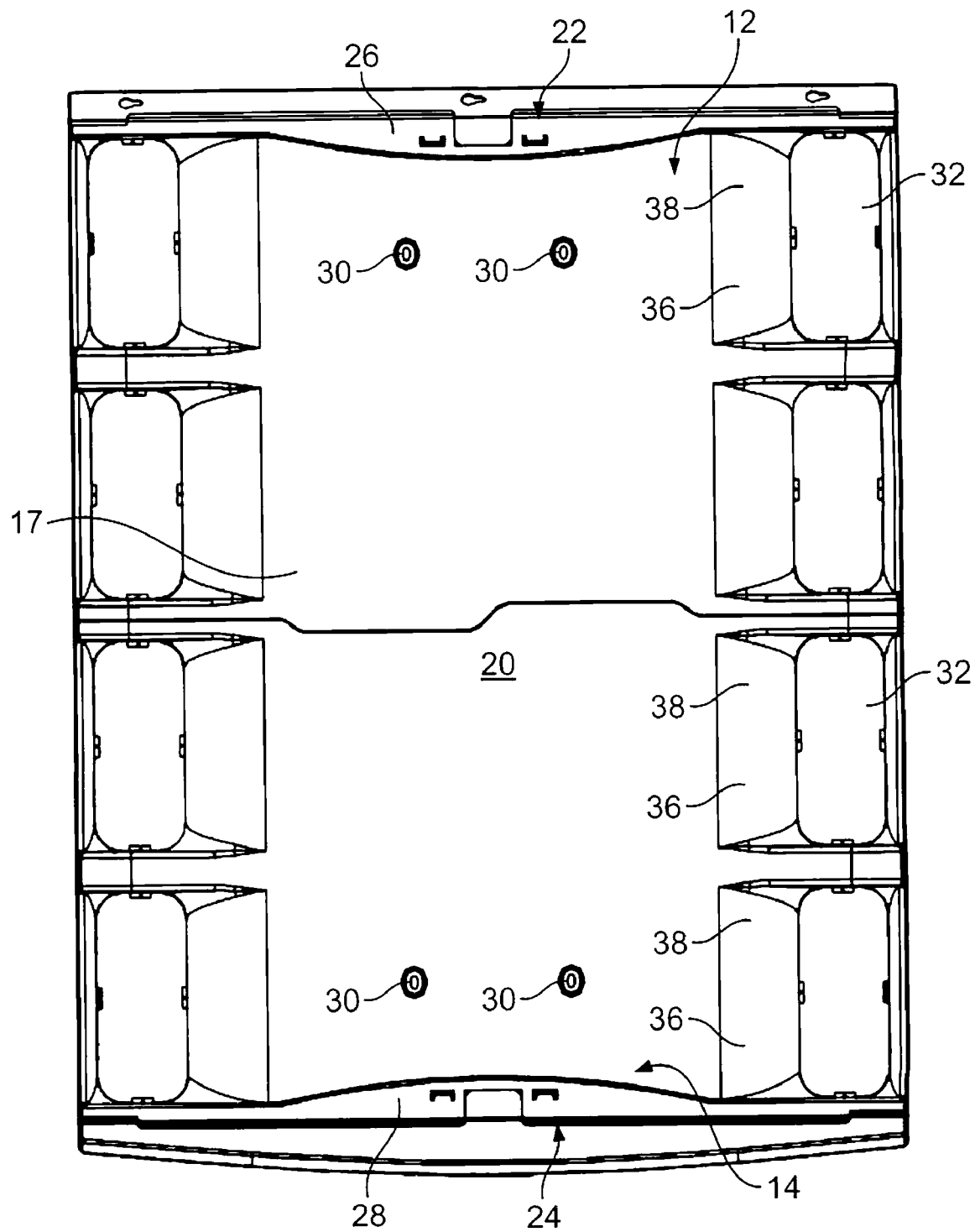
FIG. 3 is a top plan view of the of the two sections of the cable pathway member of FIG. 1, assembled.
Figure 5:
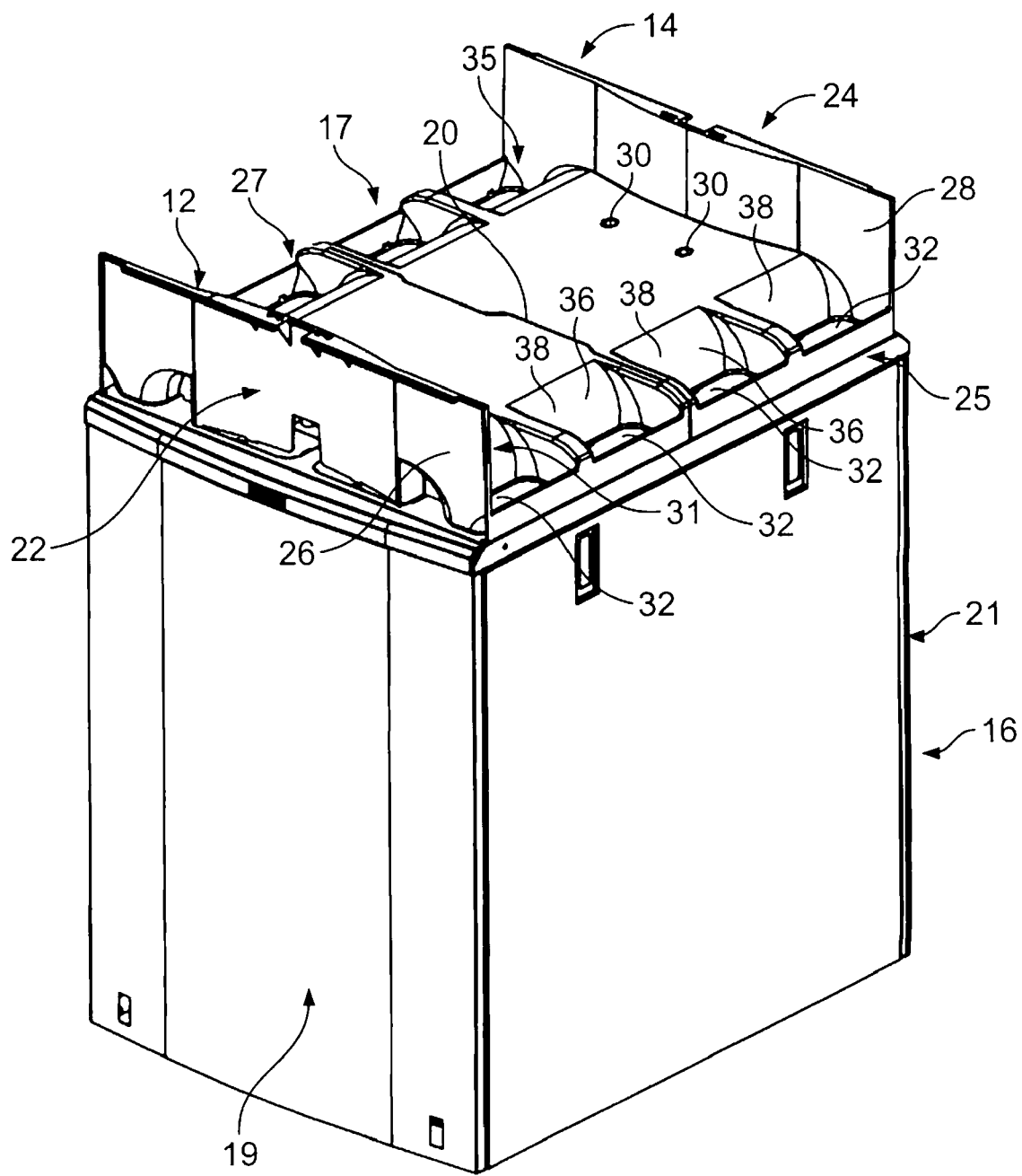
FIG. 5 is a top perspective view of the cable pathway member of FIG. 3, mounted to the top of an electronic equipment cabinet (only the top portion of the electronic equipment cabinet is shown)

With sections 12 and 14 positioned adjacent to one another, as seen in FIGS. 3 and 5, cable pathway member 10 is in its proper configuration to carry various electronic cables and is sized to be positioned on a top of an electronic equipment enclosure 16. In the current example, enclosure 16 is shown as a cabinet. However, enclosure 16 may be any number of structures such as a four post rack, a cable manager, a network cabinet, a server cabinet or any other structure designed to carry electronic equipment serviced by electronic power and/or communication cables. Cable pathway member 10 provides a pathway for positioning electronic cables along the top of an electronic equipment enclosure 16. With cable pathway 10 positioned on top of enclosure 16, installation and maintenance of the cables that service the electronic equipment disposed within the electronic equipment enclosure 16 is made easier and more convenient.

In the example shown in FIG. 1, each of sections 12 and 14 are constructed to be the same shape and size which provides for ease and convenience in manufacturing and in use. As a result, in this example each section will have the same corresponding part. Sections 12 and 14 each have a portion of a base 17' a bottom 18' and a generally planar top surface 20'. With sections 12 and 14 positioned together as seen in FIGS. 3 and 5, cable pathway member 10 is formed and a completed base 17, bottom 18, and generally planar top surface 20 are formed. With sections 12 and 14 positioned adjacent to one another, a first side 22 and a second side 24 are provided on opposing sides of pathway member 10. First side 22 comprises a first sidewall 26 and second side 24 comprises second sidewall 28. First and second sidewalls 26 and 28, each extend generally perpendicular from top planar surface 20 and extend substantially along a length of their respective first and second sides 22 and 24. First and second sidewalls 26 and 28 provide lateral confinement for cables contained in pathway member 10. Moreover, cable pathway member 10 is sized such that first sidewall 26 generally aligns with a front side 19 of electronic equipment enclosure 16 and second sidewall 28 generally aligns with a back side 21 of electronic equipment enclosure 16.

Cable pathway member 10 is configured to be secured to the top of cabinet 16 by providing, in this example, one or more holes 30 which pass through the base of each section 12 and 14. In positioning cable pathway member 10 on the top of electronic equipment enclosure 16, one or more of holes 30 are positioned to each align with a corresponding hole (not shown) in electronic equipment enclosure 16. A bolt or screw can be passed through a hole 30 and its corresponding aligned hole in enclosure 16 thereby allowing cable pathway member 10 to be secured via a nut or other fastener to electronic equipment enclosure 16.

Cable pathway member 10 is generally constructed of a molded plastic or other non-metallic material. In the example shown herein, pathway member 10 is constructed of a molded plastic. Since pathway member 10 may be required to carry a substantial amount of cables and thereby a substantial amount of weight, it is desired that base 17 be constructed of a solid construction and/or be provided with strengthening ribs to reinforce the underside of base 17. To support the weight of the cables positioned within cable pathway member 10, it is also desirable to position portions of base 17 to overlie portions of electronic equipment enclosure 16 such that the portion of base 17 which carries a larger load receives underlying support from a support structure within enclosure 16. Providing such support will prevent pathway member 10 from sagging from larger cable loads.

Base 17 of cable pathway member 10 defines at least one aperture 32 which passes from top surface 20 through bottom 18 of base 17. Positioned adjacent to aperture 32 is wall 36, which comprises a curved surface 38 that extends from top surface 20 to bottom 18 of base 17. Wall 36 supports cables which overlie top surface 20 and extend into and out of electronic equipment enclosure 16 through aperture 32. The radius of curvature of wall 36 is generally 3 inches but can be configured with any appropriate radius of curvature that will provide a smooth transition of the change of direction of the cable. The cable is positioned to extend generally horizontal in cable pathway member 10 and then changes to extend generally vertical with the cable entering or exiting from enclosure 16. Curved surface 38 provides a smooth transition of the cable as it changes direction and preserves the integrity of the cable and reliability of transmission.

Figure 4:
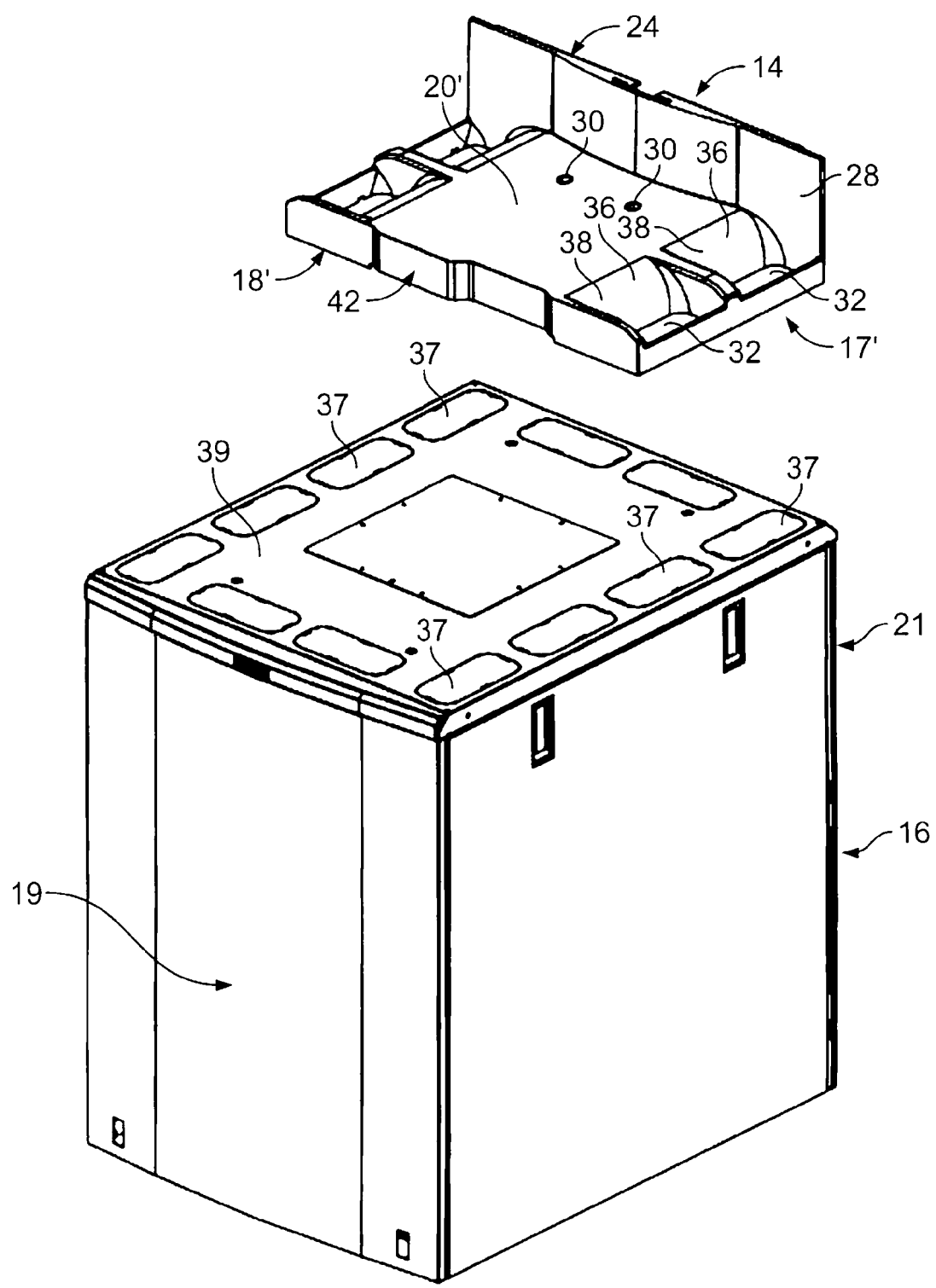
FIG. 4 is a top perspective, exploded view of one section of the cable pathway member of FIG. 2, positioned over the top of an electronic equipment cabinet (only the top portion of the electronic equipment cabinet is shown)

As can be seen in FIGS. 3-5, a first set 31 of apertures 32 are positioned adjacent to and along a third side 25 of cable pathway member 10 and a second set 35 of apertures 32 are positioned adjacent to and along an opposing fourth side 27 of cable pathway member 10. As described above, each of these apertures 32 comprises a wall 36 with a curved surface 38 positioned adjacent to apertures 32. Again, in this example the radius of curvature of wall 36 is 3 inches but can be configured with a radius that will provide a smooth transition for the cable as it changes direction. In this example, the first and second sets 31 and 35 of apertures 32 each form a row wherein, with cable pathway member 10 secured to enclosure 16, each aperture 32 is positioned to vertically align with an opening 37 positioned within top cover 39 of enclosure 16. With each aperture 32 vertically aligned with an opening 37, cables are easily positioned to extend into and out of enclosure 16 through top cover 39 and engage curved surface 38 to provide a smooth transition of the cable extending from inside of enclosure 16 to along top surface 20 of cable pathway member 10.

As described above for this example, sections 12 and 14 are positioned together to form cable pathway member 10. To facilitate alignment of sections 12 and 14, matching non-planar side surfaces 40 and 42 are provided on base 17' of each section 12 and 14 respectively. As can be seen in FIG. 1, non-planar side surface 40 of section 12 is positioned on an opposite side of section 12 from sidewall 26 and similarly, non-planar side surface 42 of section 14 is positioned on an opposite side of section 14 from sidewall 28. Non-planar side surfaces 40 and 42 complement one another and form mating surfaces such that with sections 12 and 14 placed together, they form base 17. For example, with a protrusion 44 positioned in side surface 40 fitting into a recess 46 in side surface 42, relative movement between sections 12 and 14 along side surfaces 40 and 42 is prevented.

Figure 6:
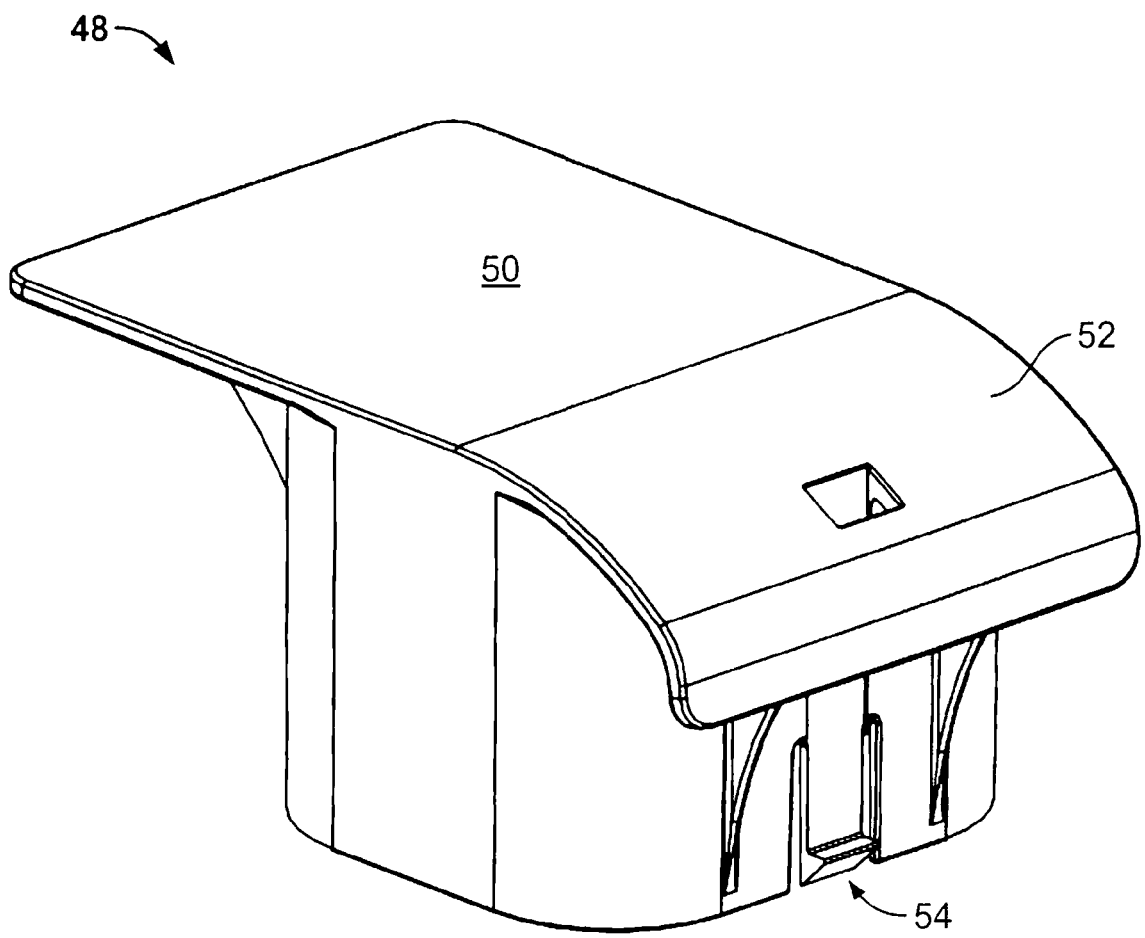
FIG. 6 is a perspective view of an insert.
Figure 7:
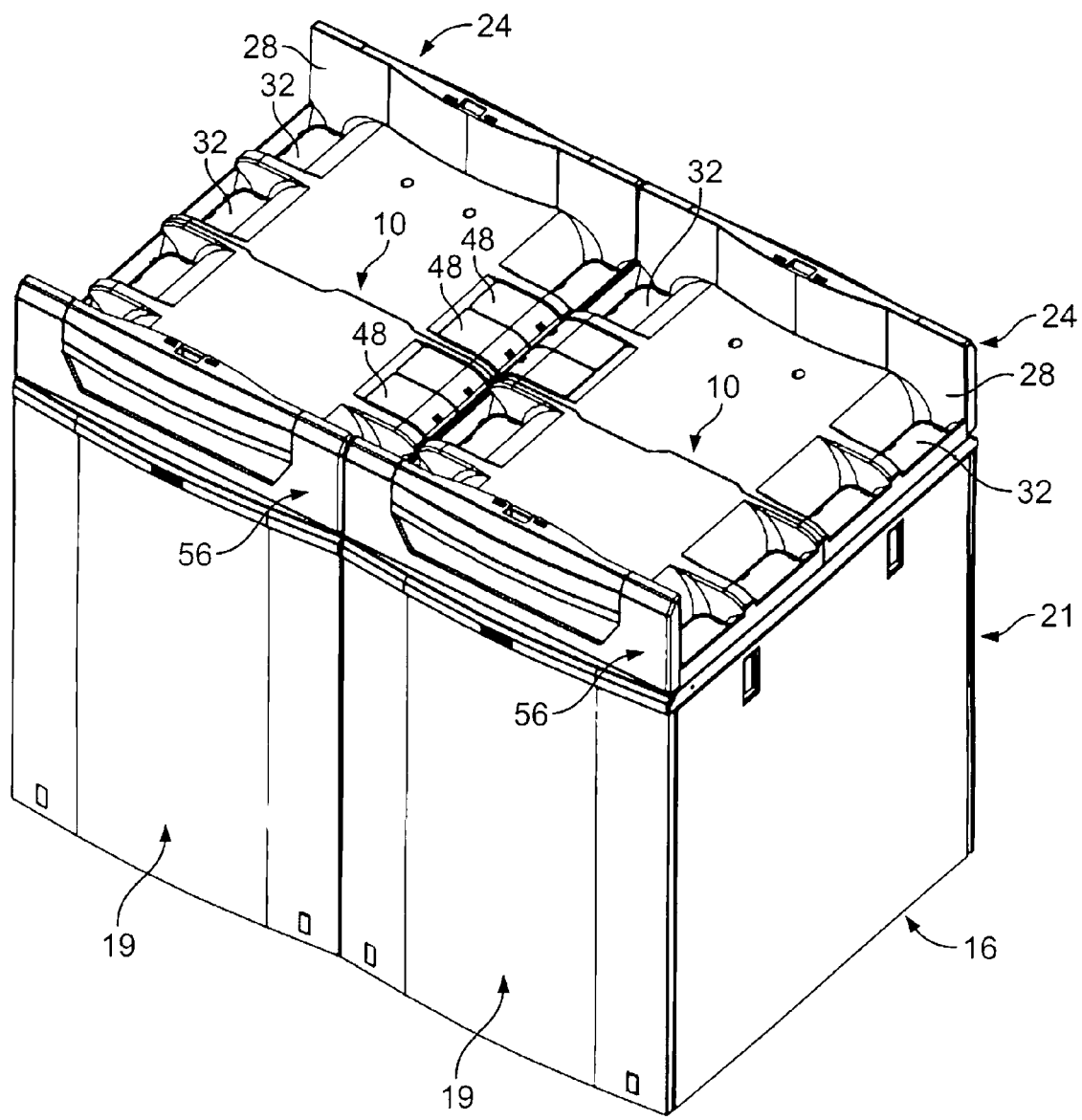
FIG. 7 is a perspective view of two cable pathway members positioned on the top of two adjacent electrical equipment cabinets (only the top portions of the electronic equipment cabinets are shown)

Referring to FIG. 6, an insert 48 is shown. Insert 48 is positionable into aperture 32, as seen in FIG. 7, thereby blocking such aperture 32 and preventing cable from entering or exiting that aperture 32. As can be seen in FIG. 7, in this example insert 48 has a size and shape such that one insert will prevent access to half of aperture 32, allowing more flexibility in the installation of the cable pathway system. However, instead of, or in addition to inserts 48, there could also be inserts that fill all of aperture 32 or that block any other fraction of aperture 32 desired. Insert 48 also provides a support surface for cables positioned in cable pathway member 10 and provides a top surface 50 which is generally planar and aligns generally with top planar surface 20 of base 17.

Insert 48 also has curved surface 52 and, as described earlier for curved surface 38 positioned in cable pathway member 10, curved surface 52 comprises a radius of curvature of 3 inches. As discussed above for curved surface 38, curved surface 52 can be configured with any radius of curvature that will provide a smooth transition of direction for cable positioned generally horizontal in cable member pathway 10 to a generally vertical position of cable entering or exiting from an adjacent enclosure 16. Such curved transition preserves the integrity of the cable and reliability of transmission. A snap release locking mechanism 54 is provided to removeably secure insert 48 to a compatible structure in base 17. Insert 48 can be easily locked into and unlocked from a desired aperture 32 and thereby cable routing pathways can be configured as needed.

Figure 8:
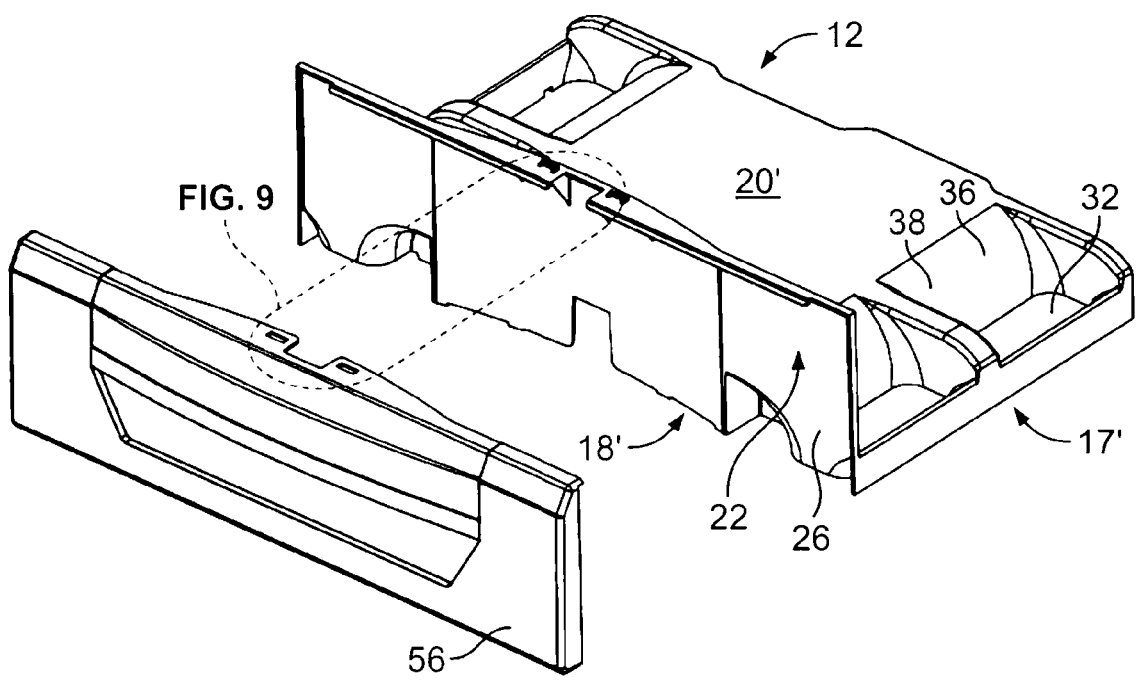
FIG. 8 is an exploded view of a shroud and one section of a cable pathway member.

Shroud 56 is shown in FIG. 8. Shroud 56 is a wall member which can be positioned and releasably secured to, in this example, sidewall 26 of section 12 of cable pathway member 10. Shroud 56 provides an aesthetic appearance to cable pathway member 10 and, as will be discussed in more detail below, provides a confinement of other accessories positioned between sidewall 26 and shroud 56.

Figure 9:
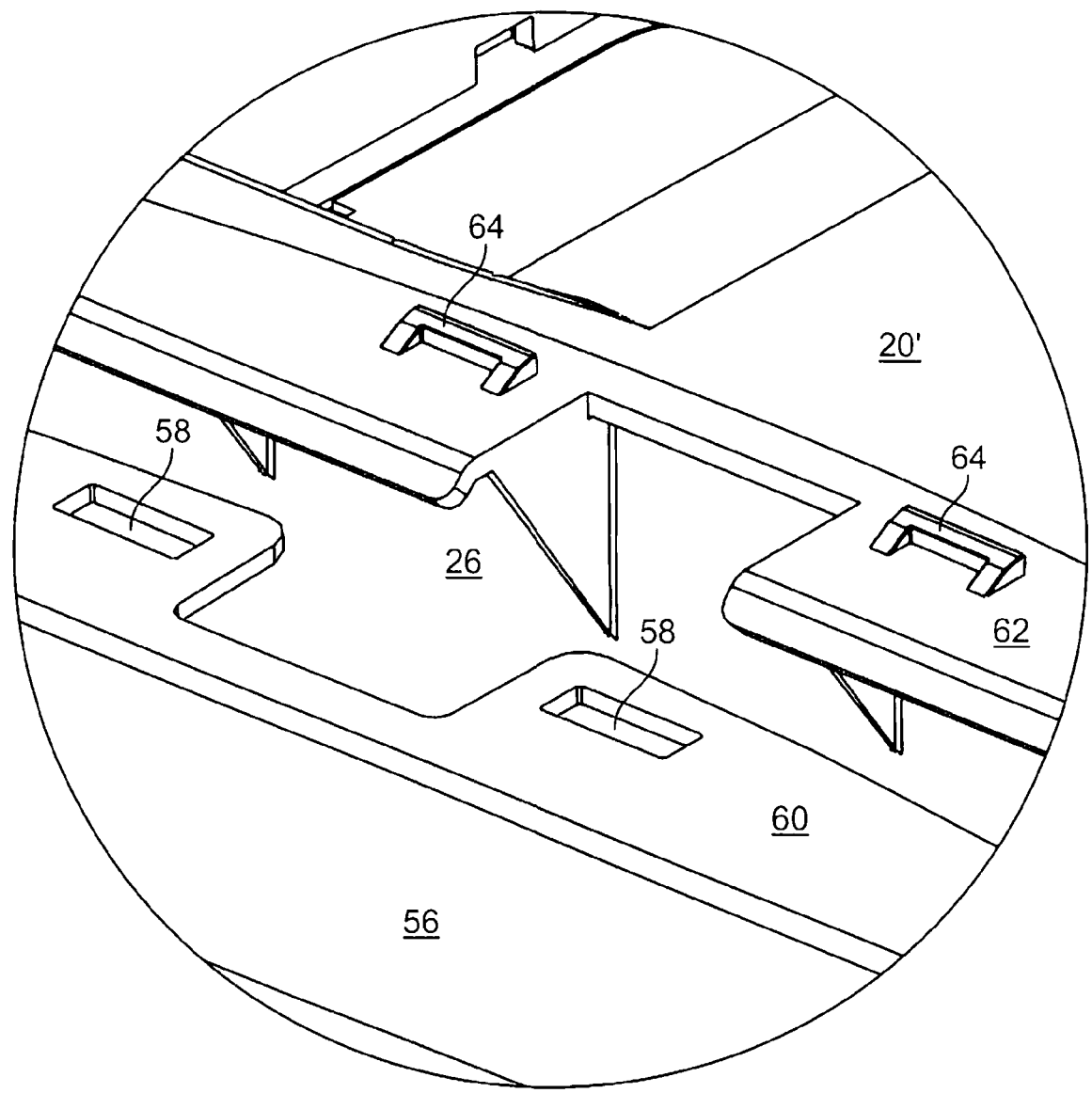
FIG. 9 is a enlarged view of the shroud and a sidewall of the cable pathway member of FIG. 8.

As seen in FIG. 9, shroud 56 is releasably secured to sidewall 26 by a snap fit structure. The snap fit structure in this example includes holes 58 positioned in substantially horizontal wall 60 positioned on and along the top of shroud 56 wherein a like wall (not shown) is positioned on the bottom of shroud 56. Horizontal wall 60 and the opposing wall (not shown) are spaced to provide a snug fit around receiving sidewall 26. Thus, with shroud 56 pushed onto sidewall 26, horizontal wall 60 rides on top of wall member 62 positioned on sidewall 26 and engages ramp members 64. Resilient horizontal wall member 60 rides up ramp members 64 until holes 58, which are aligned with ramp members 64, engage ramp members 64 and provide a locking fit between shroud 56 and sidewall 26.

Figure 10:
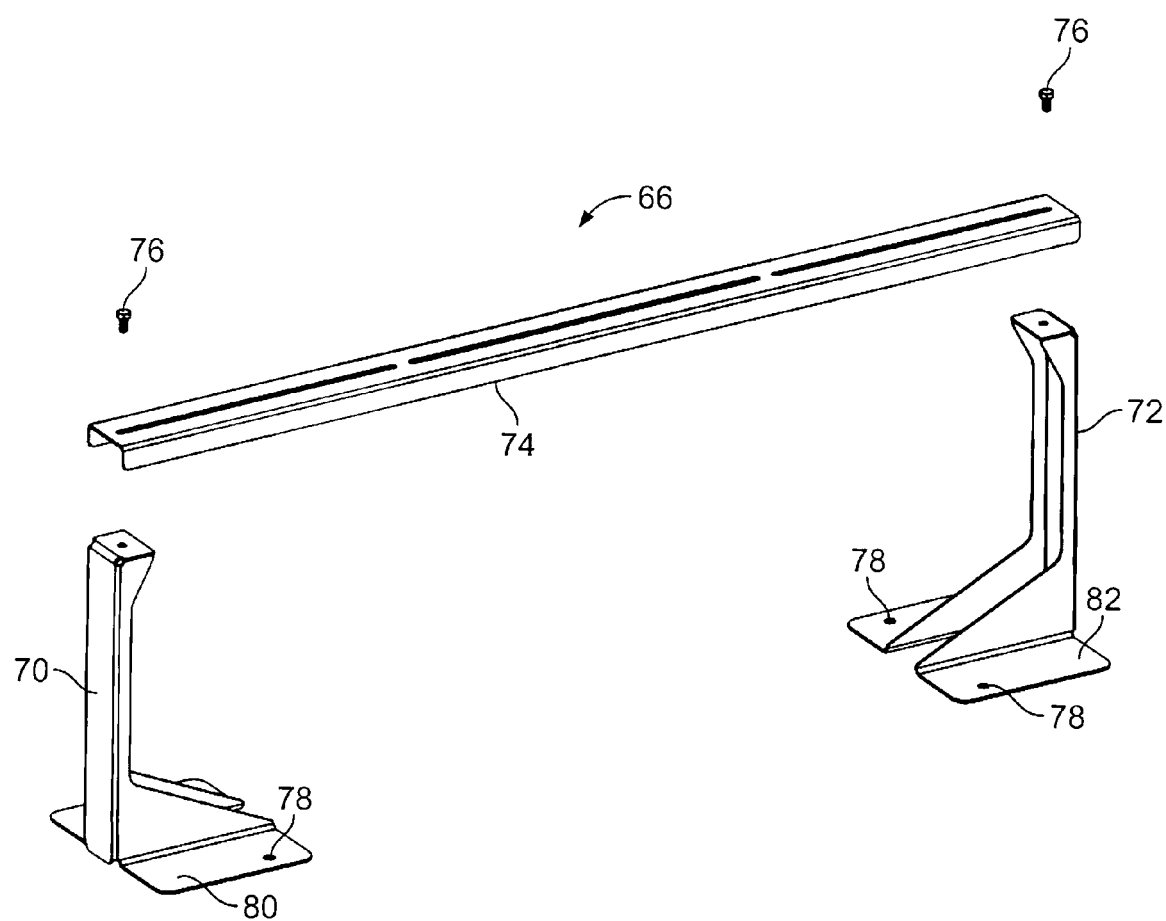
FIG. 10 is a bracket assembly.
Figure 11:
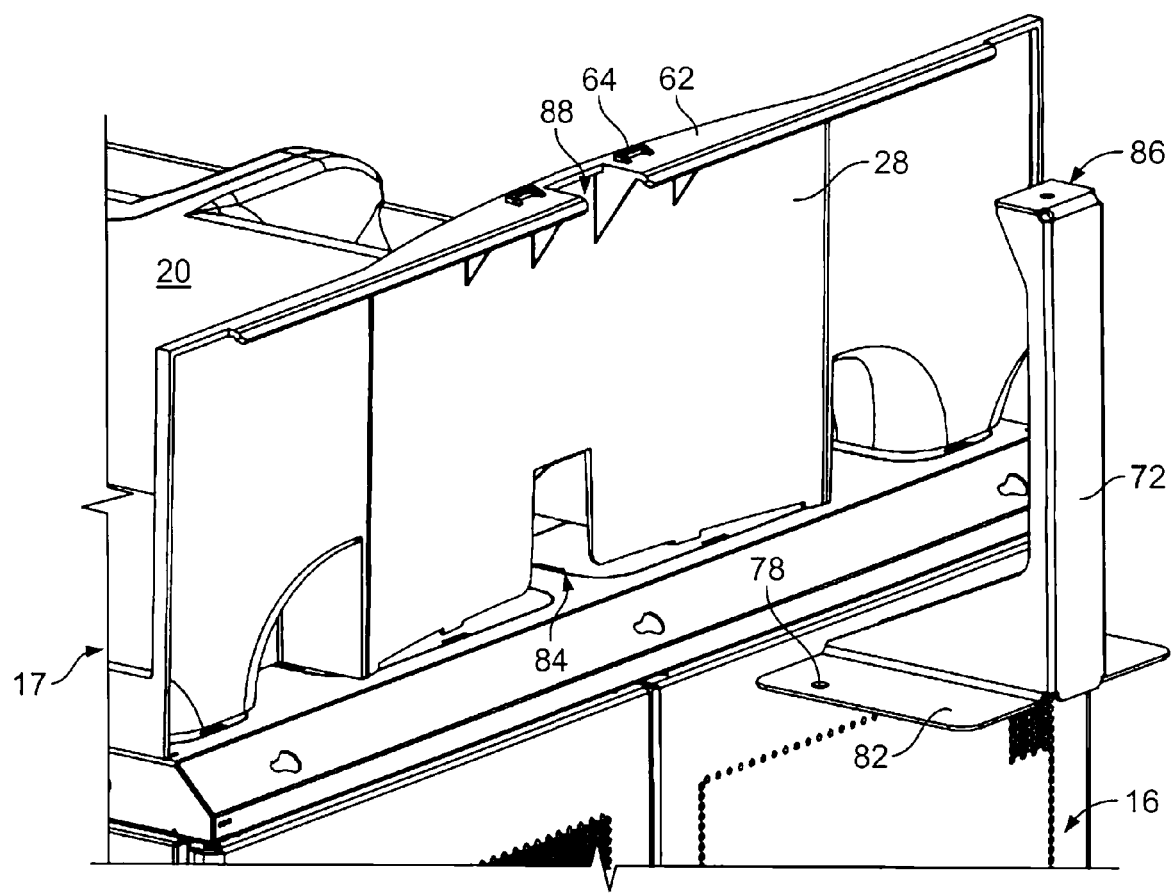
FIG. 11 is a partial cut away view of a section of the cable pathway member positioned on top of an electronic equipment cabinet and an exploded view of the bracket assembly seen in FIG. 10 in relation to the section of the cable pathway member.
Figure 12:
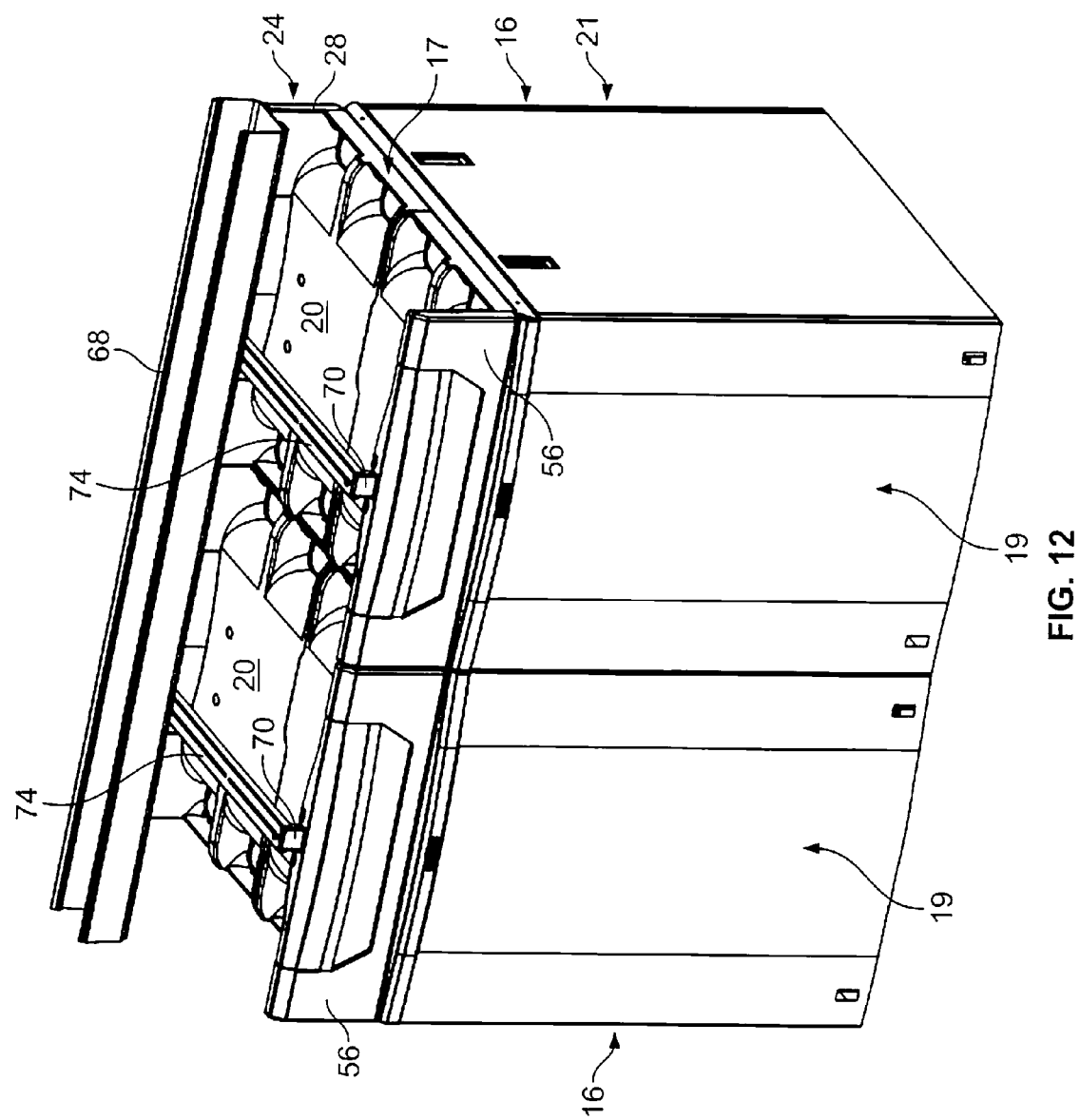
FIG. 12 is a top perspective view of two cable pathway systems positioned on top of two adjacent electronic equipment cabinets.

As shown in FIGS. 10-12, a bracket assembly 66 can also be used with cable pathway member 10 as part of the cable pathway system to provide support to cable trough 68, which is positioned to extend over and spaced apart from top surface 20 of pathway member 10. Assembly 66 includes first and second supports 70 and 72 and cross bar 74, secured to first and second supports 70 and 72 with screws 76. Holes 78 are positioned in base plates 80 and 82 of first and second supports 70 and 72 respectively. Holes 78, in this example are spaced apart and positioned on their respective base plates to vertically align with holes 30 in each section 12 and 14 of cable pathway member 10. With holes 78 aligned with holes 30, the bolts or screws described above secure sections 12 and 14 to the top or enclosure 16 will likewise secure bracket assembly 66 to the top portion of enclosure 16.

As seen in FIG. 11, second support 72 is positioned on a rear or second side 24 on top of enclosure 16, wherein second support 72 extends above base 17. Similarly, first support 70 is positioned on an opposing side of enclosure 16, front or first side 22, wherein support 70 extends above base 17. As seen with respect to base plate 82, base plate 82 slides under an opening 84 of sidewall 26 and top portion 86 of second support 72 extends through notch 88 defined in wall member 62. Again, first support 70 is similarly positioned with respect to base 17 on the opposite side of cable pathway member 10. As seen in FIG. 12, shroud 56 is positioned to cover and confine first support member 70 and likewise a shroud 56 is provided on the opposing or second side 24 of enclosure 16 (not shown), which covers and confines second support member 72.

Figure 13:
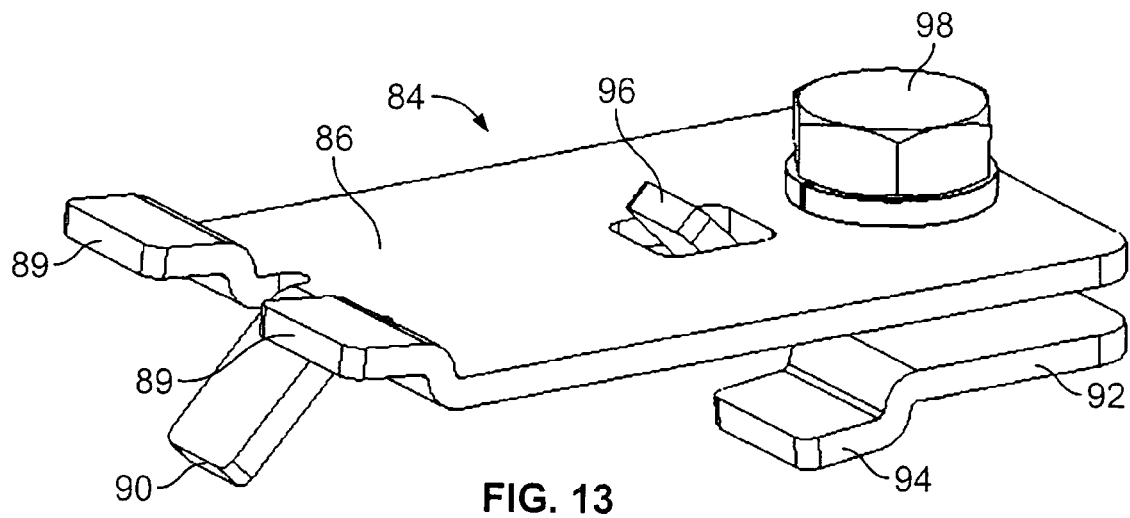
FIG. 13 is a perspective view of a mounting bracket.
Figure 14:
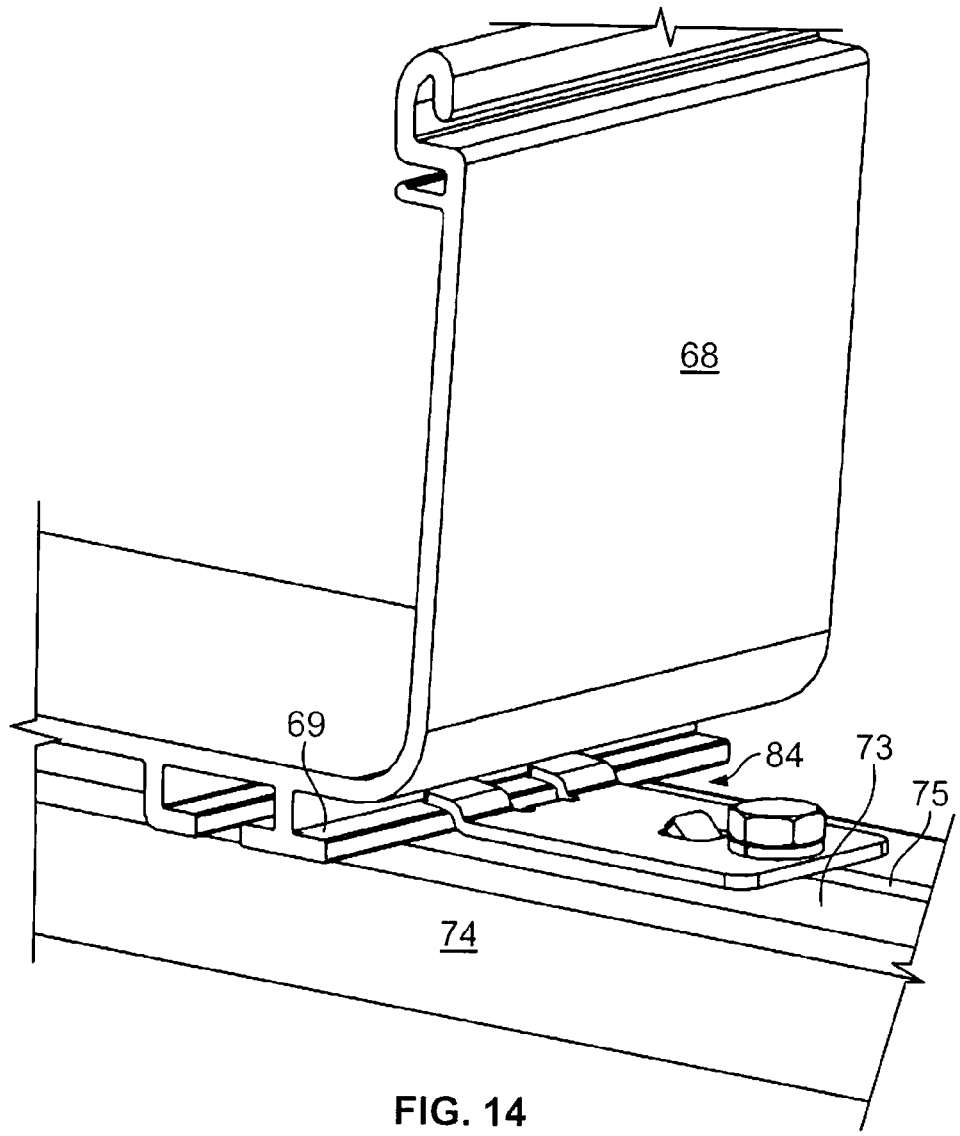
FIG. 14 is a partial cut away view of a cable trough secured to the bracket assembly of FIG. 12 utilizing the mounting bracket of FIG. 13.

Trough 68 is secured to cross bar 74, as seen in FIG. 12, and can be used to carry cables that may need to be segregated from those cables positioned in cable pathway member 10. As may be appreciated in referring to FIGS. 13 and 14, trough 68 can be releasably secured at any desired position along cross bar 74 utilizing clamp member 84. As seen in FIG. 13, clamp member 84 includes plate 86, which is adapted to overlie top surface 73 of cross bar 74, as seen in FIG. 14. Spaced apart clamping feet 89 extend generally upwardly relative to plate 86 and are positionable to overlie rail 69 of trough 68, while at the same time, toe 90 extends down through slot or opening 75. Lower plate 92, positioned beneath plate 86 and beneath cross bar 74, has reverse configuration of feet 89 and toe 90 of plate 86. Lower plate 92 includes spaced apart feet 94 and toe 96, which extends upwardly through slot or opening 75. Bolt 98 passes through openings in both plate 86 and 92 and can be tightened or loosened to move plates 86 and 92 closer together or further apart. With trough 68 positioned at a desired location on cross bar 74, clamp member 84 can be employed such that feet 89 engage the top of rail 69 of trough 68. With feet 89 in position overlying rail 69, bolt 98 can be tightened, thereby clamping feet 89 down onto rail 69. Loosening bolt 98 will cause feet 89 to unclamp from rail 69.

In assembling the exemplary cable pathway system, cable pathway member 10 is secured to the top of an electronic equipment enclosure 16 in two sections 12 and 14. Each section is positioned on the top of enclosure 16, aligned, and secured to enclosure 16. With sections 12 and 14 in proper position adjacent to and on top of enclosure 16, non-planar side surfaces 40 and 42 of the respective sections are in proper position, as discussed above, to resist relative movement between the two sections. Cable pathway member 10 is properly aligned on top of enclosure 16 such that sidewall 26 is aligned with front side 19 of enclosure 16 and sidewall 28 is aligned with rear or second side 21 of enclosure 16.

As seen in FIGS. 3 and 5, with base 17 properly positioned on top of enclosure 16, apertures 32 formed in base 17 align with openings 37 formed in a top cover 39 (see FIG. 4) of enclosure 16. Securing base 17 to enclosure 16 is accomplished by bolts inserted through holes 30, wherein, as described above, the bolts engage corresponding aligned holes in enclosure 16, thereby bolting cable pathway member 10 to enclosure 16.

Additionally, bracket assembly 66 can be secured to the top of enclosure 16 by positioning first support 70 adjacent to first side 22 of base 17 and positioning second support 72 adjacent second side 24 of base 17. Cross bar 74 is secured to first and second supports 70 and 72, thereby positioning cross bar 74 spaced apart and over top surface 20 and base 17. As described above, trough 68 can be positioned and secured to cross bar 74 and supports 70 and 72 can be secured to top of enclosure 16.

As can be appreciated from the above description, in the installation of electronic equipment, a cable pathway member 10 can be secured to the top of each adjoining enclosure 16, as seen in FIG. 7. Thus, with a number of enclosures 16 so configured, a cable pathway system can be made from the aligned cable pathway members 10.

Although the present invention has been shown and described with respect to a preferred embodiment thereof, it should be understood by those skilled in the art that the foregoing and various other changes, omissions, and additions in the form and detail thereof may be made therein without departing from the spirit and scope of the present invention.

The invention claimed is:

1. A method for providing a cable pathway system, comprising the steps of:
    positioning a base on an electronic equipment enclosure such that a bottom of the base is adjacent the electronic equipment enclosure, a first sidewall extends from the base generally aligned with a front of the enclosure, and a second sidewall extends from the base generally aligned with a back of the enclosure;
    aligning an aperture formed in the base with an opening formed in a top cover of the enclosure; and
    securing the base to the enclosure,
    wherein the base further comprises a wall positioned adjacent to the aperture, and
    wherein the wall comprises a curved surface that extends from a top surface of the base to the bottom.

2. The method for providing a cable pathway system of claim 1, wherein the radius of curvature of the curved surface is 3 inches.

3. A method for providing a cable pathway system, comprising the steps of:
    positioning a base on an electronic equipment enclosure such that a bottom of the base is adjacent the electronic equipment enclosure, a first sidewall extends from the base generally aligned with a front of the enclosure, and a second sidewall extends from the base generally aligned with a back of the enclosure;
    aligning an aperture formed in the base with an opening formed in a top cover of the enclosure; and
    securing the base to the enclosure,
    wherein positioning the base comprises the steps of:
    positioning a first section of the base on the electronic equipment enclosure such that the first sidewall is generally aligned with the front of the enclosure;
    positioning a second section of the base on the electronic equipment enclosure such that the second sidewall is generally aligned with the back of the enclosure; and
    aligning non-planar side surfaces of the first and second sections such that the first and second sections mate together to form the base.

4. A method for providing a cable pathway system, comprising the steps of:
    positioning a base on an electronic equipment enclosure such that a bottom of the base is adjacent the electronic equipment enclosure, a first sidewall extends from the base generally aligned with a front of the enclosure, and a second sidewall extends from the base generally aligned with a back of the enclosure;
    aligning an aperture formed in the base with an opening formed in a top cover of the enclosure;
    securing the base to the enclosure;
    mounting a first support adjacent the first sidewall of the base;
    mounting a second support adjacent the second sidewall of the base;
    securing a cross bar between the first and second supports such that the cross bar extends over the base; and
    securing a cable through to the cross bar.

* * * * *